(12) United States Patent
Fechner et al.

(10) Patent No.: US 8,349,750 B2
(45) Date of Patent: Jan. 8, 2013

(54) GLASS AND USE OF A GLASS FOR GLASS-METAL BONDS

(75) Inventors: Joerg Hinrich Fechner, Weiden (DE); Christof Kass, Tirschenreuth (DE)

(73) Assignee: Schott AG, Mainz (DE)

( * ) Notice: Subject to any disclaimer, the term of this patent is extended or adjusted under 35 U.S.C. 154(b) by 345 days.

(21) Appl. No.: 12/858,506

(22) Filed: Aug. 18, 2010

(65) Prior Publication Data

US 2011/0045960 A1    Feb. 24, 2011

(30) Foreign Application Priority Data

Aug. 21, 2009   (DE) .................. 10 2009 038 475

(51) Int. Cl.
*C03C 3/091* (2006.01)
*C03C 3/093* (2006.01)
*H01L 31/042* (2006.01)
*F24J 2/50* (2006.01)
*F24J 2/46* (2006.01)
*B32B 17/00* (2006.01)

(52) U.S. Cl. ............... 501/66; 501/14; 501/21; 501/67; 136/244; 445/44; 428/34.5; 428/432; 428/433; 428/434; 126/569; 126/704; 126/708

(58) Field of Classification Search .......... 501/14, 501/15, 21, 66, 67; 136/244; 445/44; 428/34.5, 428/432, 433, 434; 126/569, 704, 708
See application file for complete search history.

(56) References Cited

U.S. PATENT DOCUMENTS

| | | | |
|---|---|---|---|
| 4,259,118 A | 3/1981 | Sack | |
| 5,599,753 A | 2/1997 | Watzke et al. | |
| 6,794,323 B2 | 9/2004 | Peychert et al. | |
| 7,375,043 B2 | 5/2008 | Fechner et al. | |
| 7,491,668 B2 | 2/2009 | Fechner et al. | |
| 7,562,655 B2 | 7/2009 | Kuckelkorn et al. | |
| 2008/0057187 A1 | 3/2008 | Trapp et al. | |
| 2010/0069221 A1 | 3/2010 | Dick et al. | |

FOREIGN PATENT DOCUMENTS

| | | |
|---|---|---|
| DE | 27 56 555 | 6/1979 |
| DE | 44 30 710 | 5/1996 |
| DE | 100 35 801 | 2/2002 |
| DE | 10 2004 027 119 | 12/2004 |
| DE | 10 2004 027 120 | 12/2004 |
| DE | 10 2004 008 559 | 9/2005 |
| DE | 10 2006 041 469 | 1/2008 |
| DE | 10 2008 047 280 | 4/2010 |
| SU | 726 040 | 4/1980 |
| SU | 726 041 | 4/1980 |

OTHER PUBLICATIONS

International Standard ISO 719: "Glass-Hydrolytic Resistance of Glass Grains . . ." Oct. 1, 1995.
International Standard ISO 695: "Glass—Resistance to Attack by a Boiling Aqueous Solution . . ." May 15, 1991.
DIN 12116: "Testing the Resistance of Glass to Attack . . ." Mar. 2001.

*Primary Examiner* — Karl E Group
*Assistant Examiner* — Elizabeth A Bolden
(74) *Attorney, Agent, or Firm* — Michael J. Striker

(57) ABSTRACT

The glass of the glass-metal bond contains the following ingredients in the following amounts: $SiO_2$, 72-80 wt %; $B_2O_3$, 4-<6 wt %; $Al_2O_3$, 2-5 wt %; $Na_2O$, 4-7 wt %; $K_2O$, 0-3 wt %; CaO, 2.5-8 wt %; MgO, 0-2 wt %; BaO, 0-4 wt %; $TiO_2$, 0-5 wt %; $CeO_2$, 0-2 wt %; $Fe_2O_3$, 0-0.1 wt %; F, 0-2 wt %; and the ratio of the sum total amount of $Al_2O_3$ and $B_2O_3$ (in mol %) to the sum total amount of MgO, CaO and BaO (in mol %) in the glass is less than 5. The glass-metal bond advantageously includes a KOVAR® alloy and the glass of the aforesaid composition and connects the glass envelope tube with an inner metal absorber tube in a tube collector.

15 Claims, No Drawings

GLASS AND USE OF A GLASS FOR GLASS-METAL BONDS

CROSS-REFERENCE

The subject matter described and claimed herein below is also described in German Patent Application No. 10 2009 038 475.8, filed on Aug. 21, 2009 in Germany. This German Patent Application provides the basis for a claim of priority of invention for the invention described and claimed herein below under 35 U.S.C. 119 (a)-(d).

BACKGROUND OF THE INVENTION

1. The Field of the Invention

The invention relates to the use of a glass for glass-metal bonds. The invention also relates to the composition of the glass itself.

2. The Description of the Related Art

Glass-metal bonds are used, for example, in vacuum tube collectors. In vacuum tube collectors, a vacuum-tight glass-metal bond for thermal insulation is required between the absorber tube consisting of metal and the envelope tube consisting of glass.

Such tube collectors are used, for example, in parabolic trough solar power plants.

In parabolic trough solar power plants, the concentrated radiation produces operating temperatures of up to 400° C. in the collectors, with strong local temperature differences. Besides continual stresses due to temperature change are caused by the diurnal cycle and intermittent cloudy periods.

In high-temperature solar collectors, on the one hand so-called unmatched glass-metal bonds have to date been used. Their name is based on the fact that the glass and metal have different coefficients of thermal expansion. On the other hand so-called matched glass-metal bonds are used, in which case one possible way of achieving the match is to use a plurality of intermediate glasses. This approach, however, has various disadvantages.

DE 10 2004 008 559 A1 discloses a glass-metal bond of a tube collector, which uses an aluminum borosilicate glass that is also employed as a material for primary pharmaceutical packaging. It is not specially adapted to the requirements of a glass for tube collectors and to the requirements of producing such a glass. A similar glass composition range of a glass, in particular for solar thermal applications, is described in DE 10 2006 041 469 B3. Both glasses, with relatively high levels of boron oxide and aluminum oxide, are disadvantageous for reasons of cost and environmental protection. DE 44 30 710 C1 discloses low-boron borosilicate glasses which have a coefficient of thermal expansion $\alpha_{20/300}=5.3 \times 10^{-6}$/K.

The receiver, as the key part of a tube collector for a parabolic trough solar power plant, consists of an inner tube made of steel and an outer envelope tube made of glass. The two components must be connected vacuum-tightly by means of glass-metal bonds. Typical metals of the glass-metal bond are KOVAR® alloys.

The envelope tube requires a coefficient of thermal expansion matched to the metal.

The steel tube (absorber tube) is coated with a radiation-selective material, in order to ensure a high absorption ratio.

The vacuum between the envelope tube and the absorber tube reduces the heat loss and makes a contribution to optimal heating efficiency.

The envelope tube should be composed of a glass that has an index of refraction, which is significantly lower than that of soda-lime glasses, i.e. lower than 1.52, preferably <1.51. In this way the fraction of reflected light is reduced.

The envelope tube is provided with an antireflection layer which, together with the requisite high transmission of the glass, is intended to give a high transmission of at least 96%.

The envelope tube requires high thermal and temperature change stability, high weather resistance, i.e. a high hydrolytic stability, and high mechanical stability, i.e. high strength.

Despite its high load-bearing capacity, in particular thermal load-bearing capacity, it should readily melt in the least energy-intensive way possible. All these glass and production properties should furthermore be achievable with the least possible production and raw material costs.

SUMMARY OF THE INVENTION

It is therefore an object of the invention to provide a glass with a glass composition formulated for a matched glass-metal bond of a tube collector, which fulfils the aforesaid requirements.

It is also an object of the invention to provide a matched glass-metal bond, especially for a tube collector, made with the aforesaid glass.

This object is achieved by a glass which contains the following ingredients in the following amounts:

| | |
|---|---|
| $SiO_2$ | 72-80 wt % |
| $B_2O_3$ | 4-<6 wt % |
| $Al_2O_3$ | 2-5 wt % |
| $Na_2O$ | 4-7 wt % |
| $K_2O$ | 0-3 wt % |
| CaO | 2.5-8 wt % |
| MgO | 0-2 wt % |
| BaO | 0-4 wt % |
| $TiO_2$ | 0-5 wt % |
| $CeO_2$ | 0-2 wt % |
| $Fe_2O_3$ | 0-0.1 wt % |
| F | 0-2 wt %. | and by its use for a glass tube in a tube collector comprising a glass-metal bond. The $Al_2O_3$ content is preferably less than 5 wt %.

Similar glasses are already known from DE 100 35 801 A for use as primary packaging, for example for syringes, carpules, vials and test tubes. The production of such primary pharmaceutical packaging is based on glass tubes with a maximum outer diameter of 30 mm. Similar glasses which are likewise processed only to form tubes with very small diameters, namely backlights, are also known from DE 10 2004 027 120 A1 and DE 10 2004 027 119 A1.

The use of such glasses to produce glass tubes for solar thermal applications, which must have a diameter of more than 120 mm, and for use in glass-metal bonds, has not been considered in the past. This is attributable to the fact that it was not previously realized that these glasses combine properties which are more suitable for use in vacuum tube collectors than those of previously used glasses.

Within the composition range described above, the glass properties required for melting with the common and/or cited metals/metal alloys, these being not only the specified coefficient of thermal expansion but also an adapted transformation temperature Tg, are set in the glass composition by observing the following quotient (all amounts in each case in mol %): $(Al_2O_3+B_2O_3)/(MgO+CaO+BaO)<5$, preferably <3, particularly preferably <2. For this ratio, which ensures a particularly balanced presence of the specified components, a value of >0.5 is preferred.

The glasses according to the invention have a coefficient of thermal expansion, essential for their use according to the invention, of $5.0 \times 10^{-6}$/K to $5.8 \times 10^{-6}$/K, preferably of $5.3 \times 10^{-6}$/K to $5.7 \times 10^{-6}$/K, particularly preferably $>5.3 \times 10^{-6}$/K to $5.7 \times 10^{-6}$/K, which differs only slightly from the coefficients of thermal expansion of customary metals.

This advantageous property makes the use of junction glasses superfluous, so that an industrially automatable production process is possible. The glasses are furthermore acid- and alkali-resistant (classes S1 or S2 and A2 according to DIN 12116 and DIN ISO 695), and water-resistant (class HGB 1 or 2, DIN ISO 719). Furthermore, these glasses can also be readily processed to form tubes with outer diameters >120 mm. They furthermore may contain iron oxide. They preferably have low iron oxide content, which is particularly important owing to the transmission requirements for envelope tubes in vacuum tube collectors. The person skilled in the art knows how to achieve the low iron content by selecting suitable low-iron raw materials. They preferably have iron oxide content (specified in $Fe_2O_3$) of 50 ppm to 200 ppm, particularly preferably of 100 ppm to 150 ppm. In one particularly preferred embodiment, the glass is melted under relatively reducing conditions (for example, by setting the oxygen/gas and/or oil ratio, and/or by adding reducing substances such as sugar or coal, for example, to the batch or to the glass melt), in order to shift the $Fe^{2+}/Fe^{3+}$ equilibrium in the direction of the $Fe^{2+}$ side, in order to maximize transmission in the near IR range up to 2000 nm. Associated with this is a higher absorption in the UV range, which may represent UV protection, for example, for the absorber layer.

Moreover, the glass preferably contains only a low $H_2O$ content, since $H_2O$ also absorbs in the infrared spectral range. Hence there is a reduction in the absorption of the absorber tube and a reduction in the efficiency of the receiver tube, and there may be an additional heating of the glass tube. Low water content can be achieved by using low-water-content raw materials and also by carrying out melting in particular types of trough (e.g. all-electric trough designs or the like).

Preference is given to a glass and use thereof that contains more than 3 wt % of a sum total amount of CaO, MgO, BaO, SrO and ZnO. If the glass, as preferred, is free from ZnO and SrO, the fraction of CaO+MgO+BaO is preferably >3 wt %. If the glass, as particularly preferred, is also BaO-free, the fraction of CaO+MgO is preferably >3 wt %.

A glass which contains the following constituents in the following amounts, and its use, are preferred:

| | |
|---|---|
| $SiO_2$ | 75-80 wt % |
| $B_2O_3$ | 4.5-<6 wt % |
| $Al_2O_3$ | 2-4.5 wt % |
| $Na_2O$ | 5.5-7 wt % |
| $K_2O$ | 0-2 wt % |
| CaO | >2.5-8 wt % |
| MgO | 0-2 wt % |
| $TiO_2$ | 0-5 wt % |
| $CeO_2$ | 0-2 wt % |
| $Fe_2O_3$ | 0-0.1 wt % |
| F | 0-2 wt %. |

Particularly preferred is a $K_2O$ content <2 wt %, very particularly preferably of $\leq 1.5$ wt %. This as well reduces the raw materials costs.

Particularly preferred is a CaO content of at least 3.5 wt %. Particularly preferred is a $SiO_2$ content of at least 76 wt %.

The glass may be refined with conventional fining agents, such as $Sb_2O_3$, $As_2O_3$, NaCl, BaCl, CaCl, MgCl, $SnO_2$, $V_2O_5$, $Na_2SO_4$, $BaSO_4$ and other alkali metal sulfates and alkaline earth metal sulfates, in conventional amounts, i.e., for example, with additions of up to 0.5 wt %. It is preferable not to use $V_2O_5$. If the glass is to be BaO-free, no BaCl or $BaSO_4$ is used. If the glass is to be MgO-free, no MgCl is used. The glass used preferably contains 0.02-0.5 wt % fluoride. The person skilled in the art knows how to select the content of fluorides, which are highly volatile in the melt, in the batch so that the finished glass contains the said proportion.

$CeO_2$ also has a fining action (refining effect).

The glass may contain up to 5 wt % of $TiO_2$. However, it is preferably $TiO_2$-free. Minor amounts of $TiO_2$ may however enter the glass, for example through the raw material alumina.

In order to vary the coefficient of thermal expansion coefficient $\alpha_{20/300}$ the glass may also contain further components such as $Li_2O$ and/or ZnO and/or $ZrO_2$ in amounts of at most 1.5%, which do not detrimentally affect the properties required for use.

Except for impurities, for example $V_2O_5$, the glass preferably consists of the components $SiO_2$, $B_2O_3$, $Al_2O_3$, $Na_2O$, CaO, optionally $K_2O$, MgO, BaO, $CeO_2$, F, $Fe_2O_3$ and/or $TiO_2$ in the said amounts.

According to a preferred use, the metal/metal alloy of the glass-metal bonds is a KOVER® alloy, which is a metal material of group No 1.3981 according to DIN 17745. This material has the following composition (mass proportions in %): 28-30 Ni, up to 0.05 C, 16-18 Co, remainder Fe.

EXAMPLES

Six examples (A1-A6) of glasses according to the invention and one comparative example (V1) that is not of the invention were prepared from conventional raw materials by melting the raw materials.

For these exemplary embodiments A1-A6 and comparative glass V1, Tables I and III list the compositions in wt % (Table I) and in mol % together with the ratio of sums ($Al_2O_3$+$B_2O_3$)/(MgO+CaO+BaO) (Table III). Table II lists the following important properties for the exemplary embodiments and the comparative example:

the coefficient of thermal expansion $\alpha_{20/300}$ [$10^{-6}$/K]

the transformation temperature $T_g$ [° C.]

the processing temperature $V_A$ [° C.]

the temperature at which the glass was melted, referred to here as the melting temperature [° C.]

the relative batch cost, normalized relative to V1 the solar transmission in the wavelength interval 300-1300 nm [%]

the refractive index $n_d$.

TABLE I

Compositions (in wt % based on Oxide Content) of Glasses according to the Invention (A1-A6) and of Comparative Glass (V1)

|  | V1 | A1 | A2 | A3 | A4 | A5 | A6 |
|---|---|---|---|---|---|---|---|
| $SiO_2$ | 74.0 | 77.6 | 78.0 | 78.0 | 79.3 | 75.3 | 76.8 |
| $B_2O_3$ | 9.4 | 5.5 | 5.5 | 5.0 | 4.5 | 5.5 | 5.8 |
| $Al_2O_3$ | 6.5 | 2.1 | 3.3 | 2.9 | 2.2 | 4.3 | 4.3 |
| $Na_2O$ | 6.6 | 6.7 | 6.4 | 6.0 | 6.1 | 6.6 | 6.8 |
| $K_2O$ | 2.6 | — | 1.5 | 1.5 | 1.5 | — | 1.4 |
| MgO | — | 0.8 | 1.0 | 1.0 | 0.9 | 1.3 | 0.8 |
| CaO | 0.7 | 7.2 | 4.4 | 5.6 | 5.6 | 7.0 | 2.6 |
| BaO | — | — | — | — | — | — | 1.5 |

All the glasses in table I contain approx. 120 ppm $Fe_2O_3$. They furthermore contain NaCl as fining agent.

TABLE II

SELECTED PROPERTIES OF GLASSES ACCORDING TO THE INVENTION (A1-A6) AND COMPARATIVE GLASS (V1)

|  | V1 | A1 | A2 | A3 | A4 | A5 | A6 |
|---|---|---|---|---|---|---|---|
| $\alpha_{20/300}$, $10^{-6}$/K | 5.5 | 5.51 | 5.5 | 5.53 | 5.5 | 5.52 | 5.60 |
| $T_g$, °C. | 565 | 565 | 563 | 565 | 563 | 570 | 570 |
| $V_A$, °C. | 1175 | 1175 | 1206 | 1206 | 1206 | 1206 | 1220 |
| Melting temperature, °C. | 1500 | 1450 | n.d. | 1480 | n.d. | 1460 | n.d. |
| Batch cost | 1 | n.d. | 0.6 | n.d. | n.d. | 0.7 | n.d. |
| Solar transmission (300-1300 nm)[%] | <91% | <91% | <91% | <91% | <91% | <91% | <91% |
| $n_d$ | 1.490 | 1.505 | 1.50 | n.d. | 1.50 | 1.50 | n.d. | n.d.—not determined

TABLE III

Compositions (in mol % based on oxide content) of Glass according to the Invention (A1 to A6) and Comparative Glass (V1) plus the Ratio $(Al_2O_3 + B_2O_3)/(MgO + CaO + BaO)$

|  | V1 | A1 | A2 | A3 | A4 | A5 | A6 |
|---|---|---|---|---|---|---|---|
| $SiO_2$ | 78.1 | 78.4 | 79.6 | 79.4 | 80.3 | 76.5 | 79.7 |
| $B_2O_3$ | 8.6 | 4.8 | 4.8 | 4.4 | 3.9 | 4.8 | 5.2 |
| $Al_2O_3$ | 4.0 | 1.3 | 2.0 | 1.7 | 1.3 | 2.6 | 2.6 |
| $Na_2O$ | 6.8 | 6.6 | 6.3 | 5.9 | 6.0 | 6.5 | 6.8 |
| $K_2O$ | 1.8 | — | 1.0 | 1.0 | 1.0 | — | 0.9 |
| MgO | 0.0 | 1.2 | 1.5 | 1.5 | 1.4 | 2.0 | 1.3 |
| CaO | 0.8 | 7.8 | 4.8 | 6.1 | 6.1 | 7.6 | 2.9 |
| BaO | — | — | — | — | — | — | 0.6 |
| $(Al_2O_3 + B_2O_3)/(MgO + CaO + BaO)$ | 15.9 | 0.7 | 1.1 | 0.8 | 0.7 | 0.8 | 1.9 |

Although comparative example V1 fulfills most of the properties relevant for the desired use, it must be melted at a disadvantageously high melting temperature and has approx. ⅓ higher batch costs.

As the exemplary embodiments make clear, the glasses according to the invention have not only the following properties which are advantageous in particular for their use according to the invention, but also the following properties essential for economically viable production:

They have a thermal expansion $\alpha_{20/300}$ of from $5.0 \times 10^{-6}$/K to $5.8 \times 10^{-6}$/K, in preferred embodiments from $5.3 \times 10^{-6}$/K to $5.7 \times 10^{-6}$/K, in particularly preferred embodiments from $>5.3 \times 10^{-6}$/K to $5.7 \times 10^{-6}$/K and are therefore matched to the expansion behavior of metals used in glass-metal bonds for tube collectors and/or metal alloys, in particular Kovar alloys, They have a transformation temperature of at most 585° C., in preferred embodiments at most 575° C. With these transformation temperatures, the collector or receiver tubes consisting of these glasses can be readily processed. Higher transformation temperatures would entail greater energy consumption for manufacturing the receivers and would lead to excessive stresses in the glass-metal melting operation. With these transformation temperatures, the temperature resistance of the glasses is sufficiently high for use as envelope tubes. Their resistance to temperature fluctuation is also sufficiently high.

They have a processing temperature $V_A$ of at most 1230° C., in preferred embodiments at most 1220° C. With these processing temperatures, the collector or receiver tubes consisting of these glasses can be readily processed. Higher processing temperatures would entail greater energy consumption in the glass melt and for manufacturing the receivers.

The glasses have a high weather resistance, i.e. a very high hydrolytic stability, which is advantageous for processing the glasses and the use as tubes.

They have a high mechanical stability, i.e. a high tensile strength, which is important for processing and using the tubes.

The glasses have refractive indices of <1.52, preferably <1.51, very particularly preferably <1.50.

The glasses have the desired high solar transmission.

Their batch cost is relatively low. It can be up to about 30% lower than that of the known glasses for the use according to the invention.

The glasses according to the invention can be melted at much lower temperatures, namely <1500° C., preferably <1480° C., compared with the known glasses for the use according to the invention. The energy consumption is therefore reduced by about 10%. Furthermore, the net output of the melting unit is increased. The glasses can be melted in high yields, with virtually no melting residues as a result of unmelted batch, and they possess good finishability.

The low $B_2O_3$ content of the glasses is an advantage for reasons of cost and environmental protection.

The glasses have surprisingly high crystallization stability. As a result they can be processed effectively not only in the Danner process but also in the down-draw or Vello tube-drawing process. Depending on the desired use, however, they can also be produced as flat glasses, by float processes and roll processes, for example.

With these properties, the glasses are straightforward and economical to produce. In particular, their low $B_2O_3$ content is advantageous for cost-effective and environmentally friendly production. They can readily be processed to form tubes, even with sizeable diameters. These are outstandingly suitable for use as a glass tube in a tube collector having a glass-metal bond.

The glasses are likewise outstandingly suitable for use as cover glasses, substrate glasses or superstrate glasses in photovoltaic products.

While the invention has been illustrated and described as embodied in a glass-metal bond and glass composition for a glass tube of the glass-metal bond, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A glass-metal bond comprising a metal or metal alloy and a glass tube bonded to the metal or to the metal alloy, wherein said glass tube consists of a glass containing the following ingredients in the following amounts:

| | |
|---|---|
| $SiO_2$ | 72-80 wt % |
| $B_2O_3$ | 4-<6 wt % |
| $Al_2O_3$ | 2-5 wt % |
| $Na_2O$ | 4-7 wt % |
| $K_2O$ | 0-3 wt % |
| CaO | 2.5-8 wt % |
| MgO | 0-2 wt % |
| BaO | 0-4 wt % |
| $TiO_2$ | 0-5 wt % |
| $CeO_2$ | 0-2 wt % |
| $Fe_2O_3$ | 0-0.1 wt % |
| F | 0-2 wt %; and | wherein a ratio of a sum total amount of $Al_2O_3$ and $B_2O_3$ in mol % to a sum total amount of MgO, CaO and BaO in mol % in the glass is less than 5.

2. The glass-metal bond according to claim 1, wherein a sum total amount of CaO, MgO, BaO, SrO and ZnO in said glass is >3 wt %.

3. The glass-metal bond according to claim 1, wherein said glass contains the following ingredients in the following amounts:

| | |
|---|---|
| $SiO_2$ | 75-80 wt % |
| $B_2O_3$ | 4.5-<6 wt % |
| $Al_2O_3$ | 2-4.5 wt % |
| $Na_2O$ | 5.5-7 wt % |
| $K_2O$ | 0-2 wt % |
| CaO | >2.5-8 wt % |
| MgO | 0-2 wt % |
| $TiO_2$ | 0-5 wt % |
| $CeO_2$ | 0-2 wt % |
| $Fe_2O_3$ | 0-0.1 wt % |
| F | 0-2 wt %. |

4. The glass-metal bond according to claim 1, wherein the glass contains 50-200 ppm $Fe_2O_3$.

5. The glass-metal bond according to claim 1, wherein the glass contains 100-150 ppm $Fe_2O_3$.

6. The glass-metal bond according to claim 1, wherein the glass consists of the said ingredients.

7. The glass-metal bond according to claim 1, wherein the glass is bonded to the metal alloy and the metal alloy has the following ingredients in the following amounts: Ni, 28-30 wt %; Co, 16-18 wt %; C, up to 0.05 wt %; and Fe, remaining balance.

8. A glass containing the following ingredients in the following amounts:

| | |
|---|---|
| $SiO_2$ | 72-80 wt % |
| $B_2O_3$ | 4-<6 wt % |
| $Al_2O_3$ | 2-5 wt % |
| $Na_2O$ | 4-7 wt % |
| $K_2O$ | 0-3 wt % |
| CaO | 2.5-8 wt % |
| MgO | 0-2 wt % |
| BaO | 0-4 wt % |
| $TiO_2$ | 0-5 wt % |
| $CeO_2$ | 0-2 wt % |
| $Fe_2O_3$ | 0-0.1 wt % |
| F | 0-2 wt %; | wherein a ratio of a sum total amount of $Al_2O_3$ and $B_2O_3$ in mol % to a sum total amount of MgO, CaO and BaO in mol % is less than 5.

9. The glass according to claim 8, wherein a sum total amount of CaO, MgO, BaO, SrO and ZnO is >3 wt %.

10. The glass according to claim 8, containing the following ingredients in the following amounts:

| | |
|---|---|
| $SiO_2$ | 75-80 wt % |
| $B_2O_3$ | 4.5-<6 wt % |
| $Al_2O_3$ | 2-4.5 wt % |
| $Na_2O$ | 5.5-7 wt % |
| $K_2O$ | 0-2 wt % |
| CaO | >2.5-8 wt % |
| MgO | 0-2 wt % |
| $TiO_2$ | 0-5 wt % |
| $CeO_2$ | 0-2 wt % |
| $Fe_2O_3$ | 0-0.1 wt % |
| F | 0-2 wt %. |

11. The glass according to claim 8, containing 50-200 ppm $Fe_2O_3$.

12. The glass according to claim 8, containing 100-150 ppm $Fe_2O_3$.

13. A cover glass in a photovoltaic product, wherein said cover glass has a composition according to claim 8.

14. A substrate glass in a photovoltaic product, wherein said substrate glass has a composition according to claim 8.

15. A superstrate glass in a photovoltaic product, wherein said superstrate glass has a composition according to claim 8.

* * * * *